US010369477B2

(12) United States Patent
Scott et al.

(10) Patent No.: US 10,369,477 B2
(45) Date of Patent: Aug. 6, 2019

(54) MANAGEMENT OF RESOURCES WITHIN A VIRTUAL WORLD

(71) Applicant: Microsoft Technology Licensing, LLC, Redmond, WA (US)

(72) Inventors: James William Scott, Cambridge (GB); Haiyan Zhang, London (GB); Nicolas Villar, Cambridge (GB); Alexandra Keeley Bunting, London (GB); Jonathan Leslie Venables, London (GB); Simon Jay Carter, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 980 days.

(21) Appl. No.: 14/509,919

(22) Filed: Oct. 8, 2014

(65) Prior Publication Data

US 2016/0101361 A1    Apr. 14, 2016

(51) Int. Cl.
*A63F 13/822* (2014.01)
*A63F 13/212* (2014.01)
*A63F 13/24* (2014.01)
*A63F 13/98* (2014.01)
*G06F 3/01* (2006.01)

(52) U.S. Cl.
CPC .......... *A63F 13/822* (2014.09); *A63F 13/212* (2014.09); *A63F 13/24* (2014.09); *A63F 13/98* (2014.09); *G06F 3/011* (2013.01)

(58) Field of Classification Search
CPC ........ A63F 13/822; A63F 13/98; A63F 13/24; A63F 13/212; G06F 3/011
See application file for complete search history.

(56) References Cited

U.S. PATENT DOCUMENTS 4,445,187 A    4/1984   Best
5,474,457 A    12/1995  Bromley
(Continued)

FOREIGN PATENT DOCUMENTS

CN      1584838 A      2/2005
CN    101207640 A      6/2008
(Continued)

OTHER PUBLICATIONS

Schweikardt, Eric, "Designing Modular Robots", Nov. 19, 2013, Available at: http://www.cmu.edu/architecture/research/grad_work/2009_phdcd_schweikardt_eric.pdf.
(Continued)

*Primary Examiner* — Jasson H Yoo
(74) *Attorney, Agent, or Firm* — Klarquist Sparkman, LLP

(57) ABSTRACT

Methods of managing virtual resources within a virtual world are described which use a device comprising a connecting element to which one or more smart beads can be attached. A smart bead represents either a virtual resource in the virtual world or an action on a virtual resource in the virtual world. The device is arranged to detect and identify which smart beads are attached to the connecting element and to autonomously update quantities of one or more virtual resources based on combinations of virtual resources and/or actions on virtual resources, where at least one of the virtual resources or actions in any combination is represented by a detected smart bead. In an embodiment, the device is a fashion item such as a wearable device.

18 Claims, 4 Drawing Sheets

(56) References Cited

U.S. PATENT DOCUMENTS

| | | |
|---|---|---|
| 5,853,327 A | 12/1998 | Gilboa |
| 6,031,549 A | 2/2000 | Hayes-Roth |
| 6,149,490 A | 11/2000 | Hampton et al. |
| 6,159,101 A | 12/2000 | Simpson |
| 6,290,565 B1 | 9/2001 | Galyean, III et al. |
| 6,305,688 B1 | 10/2001 | Waroway |
| 6,454,624 B1 | 9/2002 | Duff et al. |
| 6,572,431 B1 | 6/2003 | Maa |
| 6,575,802 B2 | 6/2003 | Yim et al. |
| 6,629,591 B1 * | 10/2003 | Griswold ............... G07F 1/06 194/205 |
| 6,682,392 B2 | 1/2004 | Chan |
| 6,773,322 B2 | 8/2004 | Gabai et al. |
| 6,773,344 B1 | 8/2004 | Gabai et al. |
| 6,877,096 B1 * | 4/2005 | Chung ................. A63F 13/02 380/251 |
| 6,923,717 B2 | 8/2005 | Mayer et al. |
| 6,954,659 B2 | 10/2005 | Tushinsky et al. |
| 7,154,363 B2 | 12/2006 | Hunts |
| 7,439,972 B2 | 10/2008 | Timcenko |
| 7,568,963 B1 | 8/2009 | Atsmon et al. |
| 7,641,476 B2 | 1/2010 | Didur et al. |
| 7,695,338 B2 | 4/2010 | Dooley et al. |
| 7,749,089 B1 | 6/2010 | Briggs et al. |
| 8,058,837 B2 | 11/2011 | Beers et al. |
| 8,079,846 B1 | 12/2011 | Cookson |
| 8,087,939 B2 | 1/2012 | Rohrbach et al. |
| 8,157,611 B2 | 4/2012 | Zheng |
| 8,228,202 B2 | 7/2012 | Buchner et al. |
| 8,257,157 B2 | 9/2012 | Polchin |
| 8,292,688 B2 | 10/2012 | Ganz |
| 8,317,566 B2 | 11/2012 | Ganz |
| 8,332,544 B1 | 12/2012 | Rails et al. |
| 8,475,275 B2 | 7/2013 | Weston et al. |
| 8,548,819 B2 | 10/2013 | Chan et al. |
| 8,585,476 B2 | 11/2013 | Mullen |
| 8,628,414 B2 | 1/2014 | Walker et al. |
| 8,825,187 B1 | 9/2014 | Hamrick et al. |
| 8,854,925 B1 * | 10/2014 | Lee ..................... G04G 9/0005 368/10 |
| 8,864,497 B1 | 10/2014 | Pollak et al. |
| 8,864,589 B2 | 10/2014 | Reiche, III |
| 8,894,459 B2 | 11/2014 | Leyland et al. |
| 8,894,462 B2 | 11/2014 | Leyland et al. |
| 9,008,310 B2 | 4/2015 | Nelson et al. |
| 9,180,378 B2 | 11/2015 | Reiche |
| 9,339,729 B2 | 5/2016 | Heatherly et al. |
| 9,387,407 B2 | 7/2016 | Vignocchi et al. |
| 9,409,084 B2 | 8/2016 | Horovitz et al. |
| 9,696,757 B2 | 7/2017 | Scott et al. |
| 9,919,226 B2 | 3/2018 | Scott et al. |
| 2002/0053089 A1 | 5/2002 | Massey |
| 2002/0081937 A1 | 6/2002 | Yamada et al. |
| 2002/0082063 A1 | 6/2002 | Miyaki et al. |
| 2002/0196250 A1 | 12/2002 | Anderson et al. |
| 2003/0013524 A1 | 1/2003 | Cochran |
| 2003/0030595 A1 | 2/2003 | Radley-smith |
| 2003/0232649 A1 | 12/2003 | Gizis et al. |
| 2004/0053690 A1 | 3/2004 | Fogel et al. |
| 2005/0049725 A1 | 3/2005 | Huang |
| 2005/0132290 A1 | 6/2005 | Buchner et al. |
| 2005/0227811 A1 * | 10/2005 | Shum .................. A43B 3/0005 482/1 |
| 2005/0245302 A1 | 11/2005 | Bathiche et al. |
| 2005/0255916 A1 | 11/2005 | Chen |
| 2006/0058018 A1 | 3/2006 | Toulis et al. |
| 2006/0223637 A1 | 10/2006 | Rosenberg |
| 2007/0097832 A1 | 5/2007 | Koivisto et al. |
| 2007/0155505 A1 * | 7/2007 | Huomo ............... H04M 1/7253 463/42 |
| 2007/0188444 A1 | 8/2007 | Vale et al. |
| 2007/0198117 A1 | 8/2007 | Wajihuddin |
| 2007/0218988 A1 | 9/2007 | Lucich |
| 2007/0279852 A1 | 12/2007 | Daniel et al. |
| 2007/0293319 A1 | 12/2007 | Stamper et al. |
| 2008/0014835 A1 | 1/2008 | Weston et al. |
| 2008/0045283 A1 | 2/2008 | Stamper et al. |
| 2008/0076519 A1 | 3/2008 | Chim |
| 2008/0085773 A1 | 4/2008 | Wood |
| 2008/0153559 A1 | 6/2008 | De Weerd |
| 2008/0280684 A1 | 11/2008 | McBride et al. |
| 2009/0008875 A1 | 1/2009 | Wu et al. |
| 2009/0029771 A1 | 1/2009 | Donahue |
| 2009/0047865 A1 | 2/2009 | Nakano |
| 2009/0048009 A1 | 2/2009 | Brekelmans et al. |
| 2009/0053970 A1 | 2/2009 | Borge |
| 2009/0081923 A1 | 3/2009 | Dooley et al. |
| 2009/0082879 A1 | 3/2009 | Dooley et al. |
| 2009/0094287 A1 | 4/2009 | Johnson et al. |
| 2009/0104988 A1 | 4/2009 | Enge et al. |
| 2009/0206548 A1 | 8/2009 | Hawkins et al. |
| 2009/0251419 A1 | 10/2009 | Radely-Smith |
| 2009/0265642 A1 | 10/2009 | Carter et al. |
| 2009/0273560 A1 | 11/2009 | Kalanithi et al. |
| 2009/0291764 A1 | 11/2009 | Kirkman et al. |
| 2009/0307592 A1 | 12/2009 | Kalanithi et al. |
| 2009/0315839 A1 | 12/2009 | Wilson et al. |
| 2010/0009747 A1 | 1/2010 | Reville et al. |
| 2010/0026698 A1 | 2/2010 | Reville et al. |
| 2010/0035726 A1 | 2/2010 | Fisher et al. |
| 2010/0103075 A1 | 4/2010 | Kalaboukis et al. |
| 2010/0113148 A1 | 5/2010 | Haltovsky et al. |
| 2010/0144436 A1 | 6/2010 | Marks et al. |
| 2010/0167623 A1 | 7/2010 | Eyzaguirre et al. |
| 2010/0274902 A1 | 10/2010 | Penman et al. |
| 2010/0279823 A1 | 11/2010 | Waters |
| 2010/0311504 A1 | 12/2010 | Deegan |
| 2010/0331083 A1 | 12/2010 | Maharbiz et al. |
| 2011/0021109 A1 | 1/2011 | Le et al. |
| 2011/0028219 A1 | 2/2011 | Heatherly et al. |
| 2011/0172015 A1 | 7/2011 | Ikeda et al. |
| 2011/0215998 A1 | 9/2011 | Fitzgerald et al. |
| 2011/0239143 A1 | 9/2011 | Ye et al. |
| 2012/0007817 A1 | 1/2012 | Heatherly et al. |
| 2012/0050198 A1 | 3/2012 | Cannon |
| 2012/0052931 A1 | 3/2012 | Jaqua et al. |
| 2012/0052934 A1 | 3/2012 | Maharbiz et al. |
| 2012/0084467 A1 | 4/2012 | Birnbaum et al. |
| 2012/0122059 A1 | 5/2012 | Schweikardt et al. |
| 2012/0190453 A1 | 7/2012 | Skaff et al. |
| 2012/0190456 A1 | 7/2012 | Rogers |
| 2012/0268360 A1 | 10/2012 | Mikhailov |
| 2012/0286629 A1 | 11/2012 | Johnson et al. |
| 2012/0295700 A1 | 11/2012 | Reiche |
| 2012/0295704 A1 | 11/2012 | Reiche et al. |
| 2013/0109267 A1 | 5/2013 | Schweikardt et al. |
| 2013/0109272 A1 | 5/2013 | Rindlisbacher |
| 2013/0122753 A1 | 5/2013 | Blakborn |
| 2013/0157477 A1 | 6/2013 | McCormack |
| 2013/0165223 A1 | 6/2013 | Leyland et al. |
| 2013/0173658 A1 | 7/2013 | Adelman et al. |
| 2013/0196766 A1 | 8/2013 | Leyland et al. |
| 2013/0196770 A1 | 8/2013 | Barney et al. |
| 2013/0231193 A1 | 9/2013 | Heatherly et al. |
| 2013/0271390 A1 | 10/2013 | Lyons et al. |
| 2013/0288563 A1 | 10/2013 | Zheng et al. |
| 2013/0324239 A1 | 12/2013 | Ur et al. |
| 2014/0002580 A1 | 1/2014 | Bear et al. |
| 2014/0011595 A1 | 1/2014 | Muller |
| 2014/0055352 A1 | 2/2014 | Davis et al. |
| 2014/0141865 A1 | 5/2014 | Tropper et al. |
| 2014/0181820 A1 | 6/2014 | Vignocchi et al. |
| 2014/0213357 A1 | 7/2014 | Claffey |
| 2014/0235198 A1 | 8/2014 | Lee et al. |
| 2014/0235353 A1 | 8/2014 | Witchey |
| 2014/0273177 A1 | 9/2014 | Judkins et al. |
| 2015/0080121 A1 | 3/2015 | Garlington et al. |
| 2015/0209664 A1 | 7/2015 | Haseltine |
| 2015/0242612 A1 | 8/2015 | Moberg et al. |
| 2015/0258440 A1 | 9/2015 | Zhang et al. |
| 2015/0258458 A1 | 9/2015 | Zhang et al. |
| 2015/0268717 A1 | 9/2015 | Schlumberger et al. |
| 2015/0375114 A1 | 12/2015 | Scott et al. |

(56) References Cited

U.S. PATENT DOCUMENTS

| | | |
|---|---|---|
| 2015/0375115 A1 | 12/2015 | Bunting et al. |
| 2015/0375128 A1 | 12/2015 | Villar et al. |
| 2015/0375134 A1 | 12/2015 | Zhang et al. |
| 2016/0051904 A1 | 2/2016 | Abir |
| 2016/0101364 A1 | 4/2016 | Scott et al. |
| 2016/0104321 A1 | 4/2016 | Scott et al. |
| 2017/0232347 A1 | 8/2017 | Scott et al. |

FOREIGN PATENT DOCUMENTS

| | | |
|---|---|---|
| CN | 103096987 A | 5/2013 |
| CN | 103236720 A | 8/2013 |
| CN | 103443743 A | 12/2013 |
| CN | 103530495 A | 1/2014 |
| CN | 203434701 U | 2/2014 |
| CN | 103999012 A | 8/2014 |
| EP | 1444662 A2 | 8/2004 |
| JP | S5429063 B2 | 9/1979 |
| JP | 2011-036418 | 2/2011 |
| WO | 03027970 A2 | 4/2003 |
| WO | WO 2011/112498 | 9/2011 |
| WO | 2012162090 A2 | 11/2012 |
| WO | 2014055924 A1 | 4/2014 |
| WO | WO 2015/138267 | 9/2015 |

OTHER PUBLICATIONS

"Skylanders Swapforce", Sep. 11, 2013, Available at: http://www.skylanders.com/swapforce.

"Disney Infinity", Nov. 19, 2013, Available at: https://infinity.disney.com/en-gb.

"Cubelets", Sep. 11, 2013, Available at: http://www.modrobotics.com/.

"Shapeways", Nov. 19, 2013, Available at: http://shapeways.com/.

Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.

Kikin-Gil, Ruth, "BuddyBeads", Published on: Oct. 10, 2006, Available at: http://www.ruthkikin.com/Images/r.kikin-gil_thesis2005.pdf.

Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.

Labrune, et al., "Telebeads: Social Network Mnemonics for Teenagers", In Proceedings of Conference on Interaction Design and Children, Jun. 7, 2006, 8 pages.

Ahde, et al., "Hello—Bracelets Communicating Nearby Presence of Friends", In Proceedings of the Tenth Anniversary Conference on Participatory Design, Sep. 30, 2008, 3 pages.

Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.

Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.

Lampe, et al., "Integrating Interactive Learning Experiences into Augmented Toy Environments", In Proceedings of the Pervasive Learning Workshop at the Pervasive Conference, May 2007, 8 pages.

"Seebo Platform", Published on: Jun. 22, 2013, Available at: http://www.seebo.com/.

Raffle, et al., "Topobo: A Constructive Assembly System with Kinetic Memory", In Proceedings of the SIGCHI Conference on Human Factors in Computing Systems, Apr. 24, 2004.

Schmid, et al., "Networking Smart Toys with Wireless ToyBridge and ToyTalk", In IEEE International Conference on Computer Communications, Apr. 10, 2011, 2 pages.

Patrizia, et al., "A Robotic Toy for Children with special needs: From requirements to Design", In IEEE 11th International Conference on Rehabilitation Robotics, Nov. 20, 2013, 6 pages.

Zaino, Jennifer, "JNFC Technology Brings New Life to Games", In Journal of RFID, Oct. 1, 2012, 10 pages.

U.S. Appl. No. 14/203,991, Zhang, et al., "Generation of Custom Modular Objects", filed date: Mar. 11, 2014.

U.S. Appl. No. 14/204,239, Zhang, et al., "Gaming System for Modular Toys", filed date: Mar. 11, 2014.

U.S. Appl. No. 14/204,483, Saul, et al., "Interactive Smart Beads", filed date: Mar. 11, 2014.

U.S. Appl. No. 14/204,740, Saul, et al., "A Modular Construction for Interacting with Software", filed date: Mar. 11, 2014.

U.S. Appl. No. 14/204,929, Zhang, et al., "Storing State for Physical Modular Toys", filed date: Mar. 11, 2014.

U.S. Appl. No. 14/205,077, Zhang, et al., "Data Store for a Modular Assembly System", filed date: Mar. 11, 2014.

"Disney Infinity", Published on: Aug. 25, 2013, Available at: http://www.essentialkids.com.au/entertaining-kids/games-and-technology/disney-infinity-20130823-2sgg0.html.

Marshall, Rick, "Skylanders: Swap Force Review" Published on: Nov. 1, 2013, Available at: http://www.digitaltrends.com/game-reviews/skylanders-swap-force-review/.

Jennings, et al., "CONSTRUCT/VizM: A Framework for Rendering Tangible constructions", In Proceedings of the 14th Congress of the Iberoamerican Society of Digital Graphics, Nov. 17, 2010, 4 pages.

Kitamura, et al., "Real-time 3D Interaction with ActiveCube", In Proceedings of Extended Abstracts on Human Factors in Computing Systems, Mar. 31, 2001, 2 pages.

"Siftables are Changing the Shape of Computing", Published on: May 9, 2010, Available at: http://singularityhub.com/2010/05/05/siftables-are-changing-the-shape-of-computing/.

'Cuff—fashion wearable bracelets', 2014 Available at: http://www.elle.com/_mobile/news/fashion-accessories/cufflinc-wearable-techsrc=spr_TWITTER&spr_id=1448_51714286&linkId=7882609.

'Prodigy—Kickstarter', 2014 Available at: https://www.kickstarter.com/projects/121511007/prodigy-the-game.

Construkts—Part time UI/UX and Engineer Positions, 2014 Available at: http://www.construkts.com.

"Proxi In-Device Charging Solution", May 19, 2013, Available at: http://powerbyproxi.com/consumer-electronics/industrial/proxi-in-device-charging-solution/.

Webster, Andrew, "Nex Band is a Smart, Modular Charm Bracelet for Gaming on Your Wrist", Published on: Feb. 13, 2014, Available at: http://www.theverge.com/2014/2/13/5289404/nex-band-is-a-smart-modular-charm-bracelet.

Wu, Yingying, "Customizable Wristband Sensor for Healthcare Monitoring 24/7", Published on: Nov. 14, 2013, Available at: http://marblar.com/idea/493o7.

Betters, Elyse, "LeapFrog LeapBand is an Activity Band for Kids with Virtual Pet Capabilities", Published on: May 1, 2014, Available at: https://uk.news.yahoo.com/leapfrog-leapband-activity-band-kids-virtual-pet-capabilities-231500937.html#PQ8QOQq.

Persson, Markus, "Minecraft", May 27, 2014, Available at: https://minecraft.net/game.

"World of Warcraft 'Crafting' Skills", May 27, 2014, Available at: http://us.battle.net/wow/en/.

Kelly, Samantha Murphy, "The Reinvented Tamagotchi: Bright, Flashy and Just as Needy", Feb. 20, 2014, Available at: http://mashable.com/2014/02/20/tamagotchi-friends/.

Final Office Action dated Mar. 9, 2016, from U.S. Appl. No. 14/204,929, 7 pp.

Final Office Action dated Dec. 1, 2016, from U.S. Appl. No. 14/320,399, 9 pp.

Final Office Action dated Apr. 20, 2017, from U.S. Appl. No. 14/318,945, 9 pp.

(56) References Cited

OTHER PUBLICATIONS

Final Office Action dated May 19, 2017, from U.S. Appl. No. 14/319,628, 15 pp.
Final Office Action dated Jan. 26, 2018, from U.S. Appl. No. 14/320,399, 9 pp.
Final Office Action dated Mar. 7, 2018, from U.S. Appl. No. 14/320,154, 20 pp.
Final Office Action dated Jul. 9, 2018, from U.S. Appl. No. 15/582,146, 25 pp.
Final Office Acton dated Sep. 5, 2018, from U.S. Appl. No. 14/318,945, 10 pp.
Gilpin et al., "Robot Pebbles: One Centimeter Modules for Programmable Matter through Self-Disassembly," *IEEE Int'l Conf. on Robotics and Automation*, 8 pp. (May 2010).
Hunter et al., "Make a Riddle and Telestory: Designing Children's Applications for the Siftables Platform," *Int'l Conf. on Interaction Design and Children*, 4 pp. (Jun. 2010).
International Preliminary Report on Patentability dated Jun. 28, 2016, from International Patent Application No. PCT/US2015/038218, 7 pp.
International Preliminary Report on Patentability dated Jul. 21, 2016, from International Patent Application No. PCT/US2015/054103, 5 pp.
International Preliminary Report on Patentability dated Sep. 23, 2016, from International Patent Application No. PCT/US2015/038215, 10 pp.
International Preliminary Report on Patentability dated Sep. 23, 2016, from International Patent Application No. PCT/US2015/038216, 9 pp.
International Preliminary Report on Patentability dated Oct. 18, 2016, from International Patent Application No. PCT/US2015/038217, 10 pp.
International Search Report and Written Opinion dated Sep. 17, 2015, from International Patent Application No. PCT/US2015/038218, 10 pp.
International Search Report and Written Opinion dated Sep. 30, 2015, from International Patent Application No. PCT/US2015/038217, 11 pp.
International Search Report and Written Opinion dated Oct. 8, 2015, from International Patent Application No. PCT/US2015/038215, 11 pp.
International Search Report and Written Opinion dated Oct. 9, 2015, from International Patent Application No. PCT/US2015/038216, 13 pp.
International Search Report and Written Opinion dated Feb. 1, 2016, from International Patent Application No. PCT/US2015/054103, 12 pp.
Office Action dated Sep. 23, 2015, from U.S. Appl. No. 14/204,929, 9 pp.
Office Action dated Jul. 1, 2016, from U.S. Appl. No. 14/320,399, 8 pp.
Office Action dated Aug. 12, 2016, from U.S. Appl. No. 14/320,154, 11 pp.
Office Action dated Sep. 12, 2016, from U.S. Appl. No. 14/318,945, 10 pp.
Office Action dated Oct. 6, 2016, from U.S. Appl. No. 14/509,940, 26 pp.
Office Action dated Oct. 21, 2016, from U.S. Appl. No. 14/319,628, 16 pp.
Office Action dated Apr. 6, 2017, from U.S. Appl. No. 14/509,862, 15 pp.
Office Action dated May 10, 2017, from U.S. Appl. No. 14/320,154, 14 pp.
Office Action dated May 18, 2017, from U.S. Appl. No. 14/320,399, 9 pp.
Office Action dated Oct. 5, 2017, from U.S. Appl. No. 15/582,146, 35 pp.
Office Action dated Nov. 28, 2017, from U.S. Appl. No. 14/318,945, 10 pp.
Office Action dated Dec. 14, 2017, from U.S. Appl. No. 14/319,628, 20 pp.
Office Action dated Sep. 6, 2018, from U.S. Appl. No. 14/320,399, 10 pp.
Office Action dated Sep. 24, 2018, from U.S. Appl. No. 14/320,154, 11 pp.
Pogue, "Tiny Screens Bearing Tiny Delights," downloaded from: http://www.nytimes.com/2011/08/11/technology/interactive-cubes-recall-games-of-the-past-state-of-the-art.html, 4 pp. (Aug. 11, 2011).
"Prodigy," downloaded from: https://www.kickstarter.com/projects/hanakai/prodigy-the-game/updates, 15 pp. (downloaded on: Dec. 9, 2017).
"Tamagotchi," downloaded from: https://en.wikipedia.org/wiki/Tamagotchi, 7 pp. (downloaded on: May 15, 2017).
"TeleStory by Seth Hunter and David Merrill on Vimeo," downloaded from: https://vimeo.com/11796358, 4 pp. (downloaded on: Jul. 19, 2016).
Written Opinion dated Jun. 8, 2016, from International Patent Application No. PCT/US2015/038217, 8 pp.
Written Opinion dated Jun. 10, 2016, from International Patent Application No. PCT/US2015/038216, 8 pp.
Written Opinion dated Jun. 10, 2016, from International Patent Application No. PCT/US2015/038215, 9 pp.
"Non Final Office Action Issued in U.S. Appl. No. 15/582,146", dated Nov. 19, 2018, 22 Pages.
"Office Action Issued in European Patent Application No. 15782188.5", dated Feb. 14, 2019, 4 Pages.
"First Office Action and Search Report Issued in Chinese Patent Application No. 201580036018.X", dated Jan. 23, 2019, 28 Pages.
"First Office Action and Search Report Issued in Chinese Patent Application No. 201580036030.0", dated Jan. 31, 2019, 16 Pages.
"Non Final Office Action Issued in U.S. Appl. No. 14/318,945", dated Apr. 4, 2019, 6 Pages.
"Non Final Office Action Issued in U.S. Appl. No. 14/319,628", dated Mar. 21, 2019, 16 Pages.
"Final Office Action Issued in U.S. Appl. No. 15/582,146", dated Apr. 4, 2019, 25 Pages.
"First office action and Search Report Issued in Chinese Patent Application No. 201580054924.2", dated May 24, 2019, 13 Pages.

\* cited by examiner

MANAGEMENT OF RESOURCES WITHIN A VIRTUAL WORLD

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known methods of interacting with software.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods of managing virtual resources within a virtual world are described which use a device comprising a connecting element to which one or more smart beads can be attached. A smart bead represents either a virtual resource in the virtual world or an action on a virtual resource in the virtual world. The device is arranged to detect and identify which smart beads are attached to connecting element and to autonomously update quantities of one or more virtual resources based on combinations of virtual resources and/or actions on virtual resources, where at least one of the virtual resources or actions in any combination is represented by a detected smart bead. In an embodiment, the device is a fashion item such as a wearable device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1:
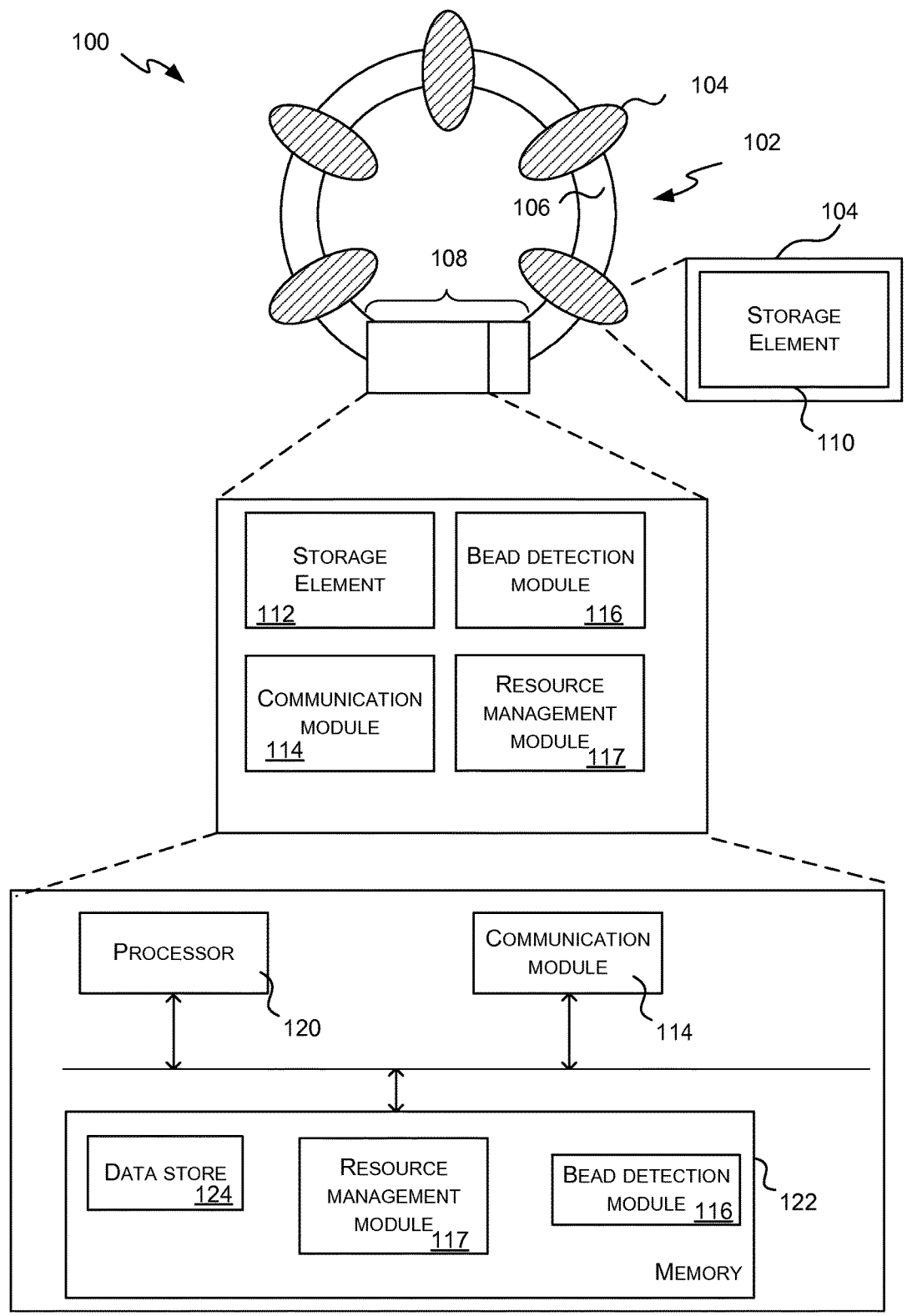
FIG. 1 is a schematic diagram of a device, such as a fashion item, which comprises a connecting element on which two or more smart beads are mounted.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Methods and apparatus (e.g. hardware) for managing (e.g. creating and consuming) resources in a virtual world are described below. As described in more detail below, the resources are managed using one or more devices, which may be fashion items. A device comprises one or more smart beads attached to a connecting element. A smart bead (which forms part of a device such as a fashion item) represents a container for a particular virtual resource in a virtual world within an interactive software experience (e.g. water, wood, etc.) or an actor which generates and/or consumes particular virtual resources in the virtual world. A resource management module autonomously updates quantities of one or more virtual resources within the virtual world (in the interactive software experience) based on detected combinations of resource containers and actors (e.g. based on detected combinations of smart beads). The resource management module may be implemented within a connecting element to which smart beads are attached or alternatively the resource management module may be implemented in a smart bead. In further examples, the resource management module may be implemented in a separate computing device (e.g. a smartphone, tablet or remote computing device).

In a first example, a first bead may represent the virtual resource 'steel' and a second bead may represent an actor which is a blacksmith. When the resource management module detects both the first and second beads at the same time, it may autonomously update quantities of virtual resources within the virtual world of the interactive software experience to reduce the amount of steel and increase the number of swords. In a second example, a first bead may represent the virtual resource 'flour', a second bead the virtual resource 'eggs', and a third bead the virtual resource 'milk'. When the resource management module detects all three of these beads at the same time, it may autonomously update resource quantities within the interactive software experience to reduce the amount of virtual milk, flour and eggs and increase the number of virtual pancakes. In the first of these examples there is an explicit actor bead (the blacksmith bead); however, in the second example there is no explicit actor bead and the actor (which may be a recipe) is integrated within the resource management module. Further examples are described below.

The term 'smart bead' is used herein to refer to an object which can be attached to (e.g. snapped, clipped or threaded onto) a connecting element (e.g. to form a bracelet or necklace) and which comprises a storage element 110 arranged to store data relating to the bead (e.g. an ID for the bead). An identifier (ID) of a bead may be unique or may not be unique but instead identify the bead type or class (e.g. one ID for a baker bead and a different ID for a flour bead).

The connecting element detects which beads are on it and may also detect any nearby beads on another connecting element. The connecting element communicates with an interactive software experience which may run on a separate computing device (e.g. a smartphone, tablet, laptop, games console, desktop computer, etc.) to enable the user (e.g. the wearer of the fashion item) to view or interact (via the fashion item and/or other user input devices) with a virtual world in which the resources and/or actors may be represented digitally (e.g. in the form of virtual characters or objects which are shown in a graphical user interface of the interactive software experience). In other examples, the interactive software experience may run on the fashion item itself (e.g. in the connecting element or a bead) or the operation of the interactive software experience may be split between the fashion item and a separate computing device (e.g. such that the separate computing device provides an augmented user experience.

The data which is communicated to the interactive software experience may comprise virtual resource quantities (e.g. updated resource quantities or updates to resource quantities) and may also comprise additional information, such as the IDs for the beads detected by the connecting element (e.g. those on the connecting element and any proximate connecting elements). The connecting element may be in substantially continuous communication with the interactive software experience (e.g. every few seconds or more frequently than this) or alternatively it may not be in constant communication with the interactive software experience but instead may connect intermittently (e.g. when in range of the computing device on which the interactive software experience is running, in response to a user input on the fashion item or in the interactive software experience, when there is new data to transmit, etc.). In various examples, the connecting element may also receive data from the interactive software experience (e.g. updated resource quantities or updates to resource quantities).

The interactive software experience includes a virtual world and may be a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc.

Although the present examples are described and illustrated in many of the examples below as being implemented in a system comprising a wearable device, the system described is provided as an example and not a limitation. As those skilled in the art will appreciate, the present examples are suitable for application in a variety of different types of systems comprising hardware tokens which represent virtual resources or actors on those virtual resources and in other examples, the hardware token may be something other than a wearable device (e.g. a non-wearable fashion item such as a phone charm, a game piece, etc.). Each hardware token stores data about the token (e.g. an ID for token) and is capable of sharing data (e.g. the ID) with the interactive software experience.

FIG. 1 is a schematic diagram of a fashion item 100 (in this example a bracelet or necklace) which comprises a connecting element 102 on which two or more smart beads 104 are mounted (e.g. threaded on the connecting element in this example). The connecting element 102 in this example comprises two parts: an elongate band 106 and a clasp 108. The clasp 108 is formed from two parts which can be joined together or separated from each other so that the wearer can put the item 100 around their wrist or neck. Although FIG. 1 shows a particular form factor for the connecting element 102 (e.g. band 106 and clasp 108), it will be appreciated that in other examples, the connecting element 102 may have a different form factor (e.g. there may be no clasp and the functionality which is described below as being in the clasp may be integrated within the band).

The term 'fashion item' is used herein to refer to both wearable items (e.g. items of jewellery) or non-wearable items (e.g. a phone charm). Examples of fashion items include, but are not limited to, phone charms, earrings, rings or hairbands, belts, watches, purses or bags (where the beads may, for example, be on the strap or the body of the item), glasses, shoe accessories, brooches, other hair accessories, other phone accessories, masks, hats, scarves, key chains and other items of clothing.

Each smart bead 104 comprises a storage element 110 (e.g. a memory) which is arranged to store an ID of the bead (which in some examples may be a unique ID for the bead or a unique ID for the type of bead) and in various examples, is also arranged to store bead data. Where the bead represents a container for a virtual resource in an interactive software experience the bead data may comprise details of the particular virtual resource and a quantity of the resource or alternatively this information may be stored elsewhere (e.g. in a remote computing device) and may be accessed using the ID for the bead. Where the bead represents an actor which generates and/or consumes virtual resources in the interactive software experience, the bead data may comprise details of the action(s) performed by the actor and any inputs to and outputs from the action. These inputs and outputs may be virtual resources and in various examples may include other things, such as real world activity by the user (as detected by one or more sensors). For example, where the actor is a miner, the action is mining and the output may be coal at a defined rate (e.g. x kg of coal per hour, although a user may be able to activate/deactivate the actor depending on whether coal is required or not at a particular time). In this example there is no input. The bead data may comprise constant data (i.e. data which does not change over the life of the bead) and/or variable data (i.e. data which changes over the life of the bead). In various examples, the storage element 110 may also be used to store other information about the bead, such as:

- a 2D/3D representation of the bead which can be used within the graphical user interface (GUI) of the interactive software experience to represent the bead (e.g. a 3D model, image and/or texture map of the container/resource/actor),
- audio snippets or text associated with an actor or resource,
- data detailing characteristics/experience of an actor which is represented by the bead (e.g. such that an actor can operate at different levels of performance based on this data),
- an audio or video message which can be played by the user via the software experience.

The connecting element 102 comprises a storage element 112, a bead detection module 116 and a resource management module 117. In many examples, the connecting element 102 further comprises a communication module 114. The bead detection module 116 detects which beads are mounted on the connecting element 102 (i.e. it both detects the presence and the identity of the beads) and may also detect and identify beads on nearby (or proximate) connecting elements. The bead detection module 116 may store details of all the detected beads (e.g. at least their bead ID) in the storage element 112. The bead detection module 116 may use any suitable technology to detect the beads on the connecting element and at any point in time, the bead detection module 116 may detect none, one or more beads on the connecting element. In various examples, there may be one or more electrical contact points between a bead and the connecting element such that there is an electric circuit comprising the bead and the connecting element and these electrical contacts (and the resultant electrical circuit) may be used to pass data (and in some examples power) between the bead and the connecting element. In other examples there may be no physical electrical contact between a bead and the connecting element and a non-contact technology such as Near Field Communication (NFC) may be used to detect the presence of beads. For example, a bead may comprise an NFC tag and the connecting element may comprise an NFC reader (e.g. the band 106 may act as an antenna for an NFC reader located in the clasp 108).

The resource management module 117 autonomously updates virtual resource quantities based on combinations of two or more detected beads. The updated quantities are communicated to the entity which represents the container for the resources (which may be a smart bead or the connecting element or the container may be within the interactive software experience, as described in more detail below) and the resource management module may also store data about the updated quantities in the storage element 112. In various examples these updates may only be generated for beads which are detected and being worn (e.g. updates may not occur when the fashion item is not being worn). In such examples, the connecting element 102 may comprise one or more sensors for detecting when the fashion item 100 is being worn (e.g. based on detection of body heat or motion). As described below, the changes in virtual resource quantities are subsequently reflected within the interactive software experience (e.g. represented visually within the GUI).

Whilst in many examples these combinations of two or more detected beads comprises two or more beads which were detected at substantially the same time (e.g. so that the two or more beads were on the connecting element at the same time or one on was on the connecting element and another was on a proximate connecting element at the same time), in some examples, the combinations of detected beads which trigger updates in resource quantities may be beads that are not detected (and in some examples not on the connecting element) at the same time.

The communication module 114 (where provided) enables the fashion item 100 (and in particular the connecting element 102) to communicate with a computing device running the interactive software experience. Any suitable wireless communication technology may be used by the communication module 114 to communicate with the software experience, e.g. Bluetooth®, Bluetooth® Low Energy (BLE), WiFi™ or WiFi™ Direct, NFC, 802.15.4, etc. The communication module 114 may communicate directly with the computing device running the software experience (e.g. smartphone, tablet computer, games console, etc.) or may communicate via a network (e.g. a home network or the internet) or intermediary device (e.g. a wireless access point).

In various examples, the fashion item (e.g. the connecting element 102 and/or a smart bead 104) may comprise a display or other visual indicator (e.g. one or more LEDs) and capabilities to represent quantities of virtual resources (or changes in quantities of resources) via the display or other visual indicator. For example, a bead may comprise one or more LEDs to indicate how much of a virtual resource is "within" the container (e.g. whether it is full, half full or empty).

Figure 2:
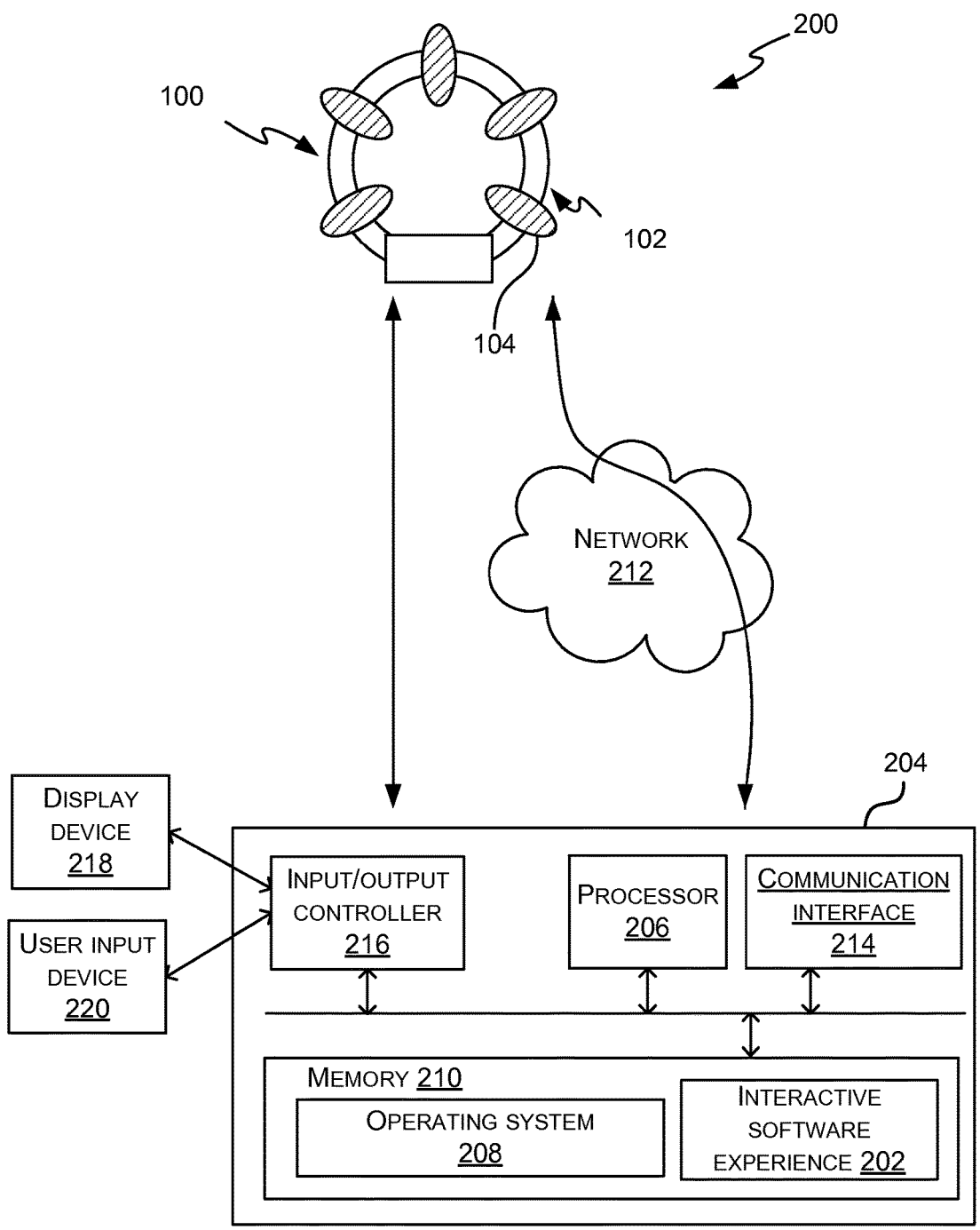
FIG. 2 is a schematic diagram of an example system comprising the device from FIG. 1.

The information which is communicated from the fashion item 100 to the software experience (via the communication module 114) comprises virtual resource quantity data (e.g. absolute amounts or changes in an amount) and/or may the IDs of the beads 104 on the connecting element 102 (e.g. where the virtual resource quantity data for a bead is stored on a remote computing device and indexed by the ID, the bead ID may be communicated and not any virtual resource quantity data). In various examples, the information which is communicated from the fashion item 100 to the software experience may also comprise some or all of the bead data stored in each of the beads on the connecting element 102. In various examples, the connecting element 102 may aggregate the data prior to sending it to the software experience (e.g. to reduce the amount of data which is transmitted). As described above, in various examples, the interactive software experience may run on the fashion item and in other examples it may run on a separate computing device (e.g. as shown in FIG. 2 and described below).

The bead detection module 116 and the resource management module 117 may be implemented in hardware and/or software. In various examples, the bead detection module 116 and/or the resource management module 117 may comprise software (i.e. device-executable instructions) which is stored in a storage element (e.g. memory 122) within the connecting element 102. In such an example, the connecting element 102 comprises a processor 120 which executes one or both of:

the device-executable instructions of the bead detection module 116 in order to detect the beads 104 that are mounted on the connecting element 102; and the device-executable instructions of the resource management module 117 in order to autonomously update resource quantities based on detected combinations of beads.

The processor 120 may be a microprocessor, controller or any other suitable type of processor for processing computer executable instructions to implement the functionality described herein. In such an example, the data generated by the bead detection module 116 and/or resource management module 117 may also be stored in the memory 122 (e.g. in data store 124).

The connecting element 102 may comprise additional elements not shown in FIG. 1. For example, the connecting element 102 may comprise a battery and provide power to the beads and this may, for example, be achieved through physical electrical connections between a bead and the connecting element or alternatively, inductive rings may be used to couple power from the connecting element into a bead. In other examples, a special power bead (comprising a battery) may provide power to the connecting element and/or other beads. Such a power bead may, in various examples, not comprise a storage element 110 and may not represent a container for a resource or an actor on a resource within the interactive software experience.

It will be appreciated that the beads 104 shown in FIG. 1 may comprise additional elements not shown in FIG. 1, such as batteries, sensors, actuators (e.g. a vibration module which may be used to signal to a user that an action is being performed), displays (e.g. LEDs), additional hardware logic, etc. In an example, a bead may comprise a user input mechanism (e.g. a dial or button). By interacting with the bead a user may, for example, update a resource quantity, trigger an action by an actor, etc. In examples where a bead comprises a sensor, sensor data may be stored in the storage element 110 and received by the connecting element 102 (e.g. by the bead detection module 116). The sensor data may then be used by the resource management module (e.g. to affect the autonomous updating of resource quantities) and/or passed to the interactive software experience (e.g. via the communication module 114) and may affect the functionality of the interactive software experience.

Although all the beads are shown as being of the same form factor in FIG. 1, it will be appreciated that in some examples the beads may be shaped to resemble the actor/container/resource to which the bead relates.

FIG. 2 is a schematic diagram of a system 200 comprising the fashion item 100 from FIG. 1. The system 200 further comprises the interactive software experience 202 and the computing device 204 on which it runs. The computing device 204 which runs the interactive software experience 202 comprises one or more processors 206 which may be microprocessors, controllers or any other suitable type of processors for processing computer executable instructions to control the operation of the computing device 204 in order to run the interactive software experience 202. In some examples, for example where a system on a chip architecture is used, the processors 206 may include one or more fixed function blocks (also referred to as accelerators) which implement a part of the method of running the interactive software experience 202 in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 208 or any other suitable platform software may be provided at the computing device to enable application software, such as the interactive software experience 202 to be executed on the device 204. The computer executable instructions (including the computer executable instructions for the interactive software experience 202) may be provided using any computer-readable media that is accessible by computing device 204. Computer-readable media may include, for example, computer storage media such as memory 210 and communications media. Computer storage media, such as memory 210, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 210) is shown within the computing device 204 it will be appreciated that the storage may be distributed or located remotely and accessed via a network 212 or other communication link (e.g. using communication interface 214).

The computing device 204 may also comprise an input/output controller 216 arranged to output display information to a display device 218 which may be separate from or integral to the computing device 204. The display information provides the GUI for the interactive software experience. In various examples where the display device 218 is part of (or connected to) a separate computing device (and is not integral to or a peripheral of computing device 204), the display information may alternatively be transmitted via the communication interface 214. The input/output controller 216 may also be arranged to receive and process input from one or more devices, such as a user input device 220 (e.g. a mouse, keyboard, camera, microphone or other sensor). In some examples the user input device 220 may detect voice input, user gestures or other user actions and may provide a natural user interface (NUI). This user input may be used to provide inputs to the interactive software experience 202. In an embodiment the display device 218 may also act as the user input device 220 if it is a touch sensitive display device. The input/output controller 216 may also output data to other devices which are not shown in FIG. 2.

It will be appreciated that inputs to the interactive software experience 202 may also be received via the communication interface 214. For example, where the display device 218 is remote from the computing device 204 and is part of, or connected to, another computing device, inputs may be made by a user via a user input device which is part of, or connected to, that other computing device and the input commands may be communicated from that computing device to the computing device 204 running the interactive software experience 202 via the communication interface 214.

Any of the input/output controller 216, display device 218 and the user input device 220 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 3:
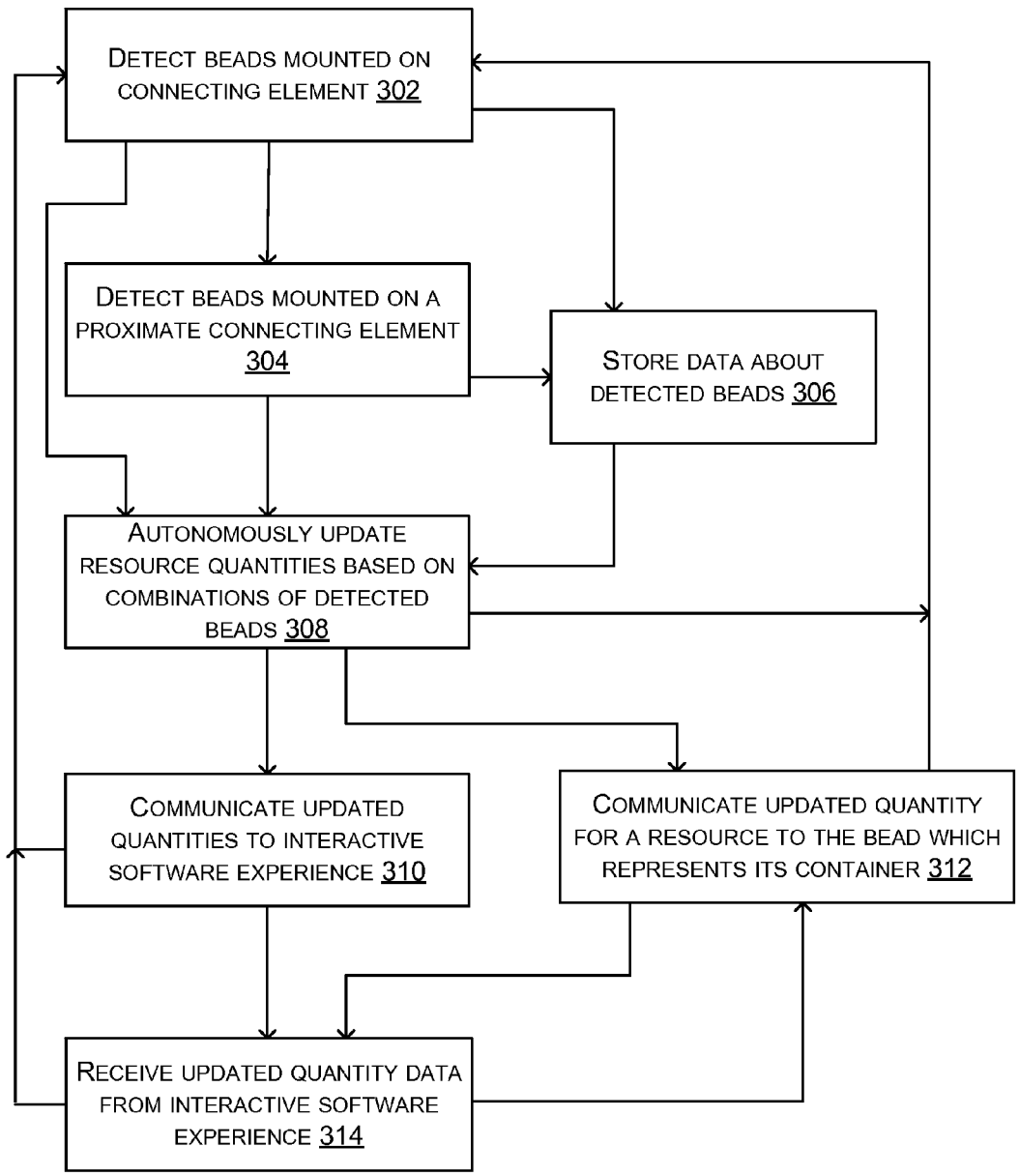
FIG. 3 is a flow diagram of an example method of operation of a connecting element.

Operation of the system 200 (and in particular fashion item 100) can be described with reference to FIG. 3 which is a flow diagram of an example method of operation of a connecting element 102. There are a number of different implementation scenarios according to whether the beads represent containers and/or actors and five examples are shown in the table. Each of these scenarios is described in detail below with reference to FIG. 3.

|  | Scenario 1 | Scenario 2 | Scenario 3 | Scenario 4 | Scenario 5 |
| --- | --- | --- | --- | --- | --- |
| Container | Bead | Connecting element | Interactive software experience | Bead | Bead |
| Actor | Connecting element | Bead | Bead | Bead | Bead |

-continued

|  | Scenario 1 | Scenario 2 | Scenario 3 | Scenario 4 | Scenario 5 |
|---|---|---|---|---|---|
| Resource Manager | Connecting element | Connecting element | Connecting element | Connecting element | Bead |

In the first scenario, a smart bead represents a container for a particular virtual resource (or more than one virtual resource) in an interactive software experience and there is no explicit actor. Instead the actions (which generate and/or consume particular virtual resources in the interactive software experience) are implemented within the resource management module in the connecting element. The resource management module also acts as resource manager (and autonomously updates resource quantities within the interactive software experience based on detected combinations of beads). In this first scenario, the bead detection module 116 detects beads that are on the connecting element (block 302), where these beads may be mounted on the connecting element, e.g. threaded onto the connecting element (as shown in FIGS. 1 and 2), attached to the connecting element (e.g. using glue or other fixing means) or otherwise connected to the connecting element. In addition to detecting beads on the connecting element (in block 302), the bead detection module 116 may also detect beads on any proximate connecting elements (block 304).

A second connecting element is considered as being proximate if it is sufficiently close to the first connecting element 102 that the first connecting element 102 can detect beads on the second connecting element or can communicate with the second connecting element. The distances involved (e.g. the maximum separation of proximate connecting elements) will therefore depend upon the wireless technology, antennas, mutual orientation, and transmit signal powers used within the connecting elements, (e.g. more distant connecting elements may be considered proximate where WiFi™ is used compared to where NFC is used) and may also depend upon the environment in which the fashion items are used (e.g. as the environment may affect the range of a particular wireless technology).

Data about any detected beads (from blocks 302 and 304), e.g. the resource(s) and the quantity of the resource(s) that each bead represents, may be stored in storage element 112 (block 306). The data that is stored may also comprise the bead IDs and/or any other information which is stored on the bead (e.g. in storage element 110) and received by the bead detection module 116.

Where the connecting element detects more than one bead (in block 302 and/or 304), the resource management module 117 autonomously updates one or more resource quantities based on combinations of two or more of the detected beads (block 308) and based on actors within the resource management module 117. These actors may, for example, be represented as equations or expressions which define the effect of certain combinations of resources, e.g. the combination of a rain resource (represented by a cloud bead) and a field resource may result in an increase in the amount of a wheat resource (rain+field→wheat). The updated quantities of virtual resources are communicated to the interactive software experience 202 using communication module 114 (block 310) and also to those beads that represent a container for a resource which has an updated quantity (block 312) e.g. using the bead detection module 116. For example the reduced amount of rain may be communicated to the cloud bead. In some examples there may not be a bead on the connecting element which corresponds to a resource which is generated by the detected combination of beads (e.g. there may not be a bead which represents a container for wheat) and in which case, the updated quantity of the particular resource (e.g. wheat) may only be communicated to the interactive software experience (in block 310). Alternatively, a bead on the connecting element may be newly designated (by the resource management module 117) as a container for the generated resource and the updated quantity may be communicated to that bead (in block 312). In some examples a virtual resource may be an input to an action (e.g. the field bead in the earlier example) but may not be depleted by the action. In this case, the resource management module does not update the quantity of that resource when increasing the amount of any output resource.

In various examples, the connecting element 102 (via communication module 114) may also receive updated quantity data from the interactive software experience (block 314) and this updated quantity data may then be communicated to the beads that represent a container for a resource which has an updated quantity (block 312, e.g. using the bead detection module 116). These updates may be a result of user interaction with the interactive software experience (e.g. to purchase or earn additional resources).

In the second scenario, a smart bead represents an actor rather than resource and the containers for the resources are implemented within the resource management module which also acts as resource manager (and autonomously updates resource quantities within the interactive software experience based on detected combinations of beads). As in the first scenario, the bead detection module 116 detects beads that are on the connecting element (block 302). In addition to detecting beads on the connecting element (in block 302), the bead detection module 116 may also detect beads on any proximate connecting elements (block 304). As described above, in this second example each detected bead represents an actor which generates and/or consumes particular virtual resources in the interactive software experience.

Data about any detected beads (from blocks 302 and 304), e.g. the actor that each bead represents or the actions performed by the actor, may be stored in storage element 112 (block 306). The data that is stored may also comprise the bead IDs and/or any other information which is stored on the bead (e.g. in storage element 110) and received by the connecting element from the bead.

Where the connecting element detects more than one bead (in block 302 and/or 304), the resource management module 117 autonomously updates one or more virtual resource quantities based on combinations of two or more of the detected beads (block 308). In this second scenario, the resource management module represents containers of virtual resources in the interactive software experience and each container contains a quantity of those resources (although they may be empty). The actors which the detected beads represent therefore consume resources from containers within the resource management module 117. These actors may, for example, be represented as equations or expressions which define the effect of certain combinations of available resources and in some examples, also combinations of actors. For example, a first detected bead may be an apple picker bead which consumes "orchard" resources to generate "apples". A second detected bead (which may be detected at the same time or subsequently to the apple picker bead) may be a baker bead which consumes "apples" and generates "apple pies". The updated quantities of resources are communicated to the interactive software experience 202 using communication module 114 (block 310). As the beads represent actors rather than containers, the updated quantities are not transmitted to any beads (block 312 is omitted). In various examples, the connecting element 102 (via communication module 114) may also receive updated quantity data from the interactive software experience (block 314).

The third scenario is very similar to the second scenario, except that the containers for the virtual resources are represented within the interactive software experience only and not also in the connecting element. In this case, the resource management module 117 accesses virtual resource quantities from the interactive software experience (e.g. block 314 occurs at some point prior to block 308). The accessed information is then used when autonomously updating one or more resource quantities based on combinations of two or more of the detected beads (in block 308). The actors which the detected beads represent, in this scenario, consume resources from containers within the interactive software experience. The updated quantities of resources are communicated to the interactive software experience 202 using communication module 114 (block 310). As the beads represent actors rather than containers, the updated quantities are not transmitted to any beads (block 312 is omitted).

In the fourth scenario, there are some smart beads which represent a container for a particular resource in an interactive software experience and other smart beads which represent actors which generate and/or consume particular resources in the interactive software experience, or a smart bead may represent both an actor and a resource. A fashion item may comprise one or more resource beads and/or one or more actor beads and/or one or more combined actor and resource beads. In this scenario, the bead detection module 116 detects beads that are on the connecting element (block 302). In addition to detecting beads on the connecting element (in block 302), the bead detection module 116 may also detect beads on any proximate connecting elements (block 304).

Data about any detected beads (from blocks 302 and 304), e.g. the resource(s) and the quantity of the resource(s) that a resource bead represents, and actions associated with any actor beads, may be stored in storage element 112 (block 306). As described above, the actions may be represented as equations or expressions which define the effect of certain combinations of resources and/or actors. The data that is stored may also comprise the bead IDs and/or any other information which is stored on the bead (e.g. in storage element 110) and received from the bead by the connecting element.

Where the connecting element detects more than one bead (in block 302 and/or 304), the resource management module 117 autonomously updates one or more resource quantities based on combinations of two or more of the detected beads (block 308). In various examples each combination may comprise at least one actor bead and at least one resource bead. In other examples, each combination may comprise a single actor bead and at least one resource bead. The updated quantities of resources are communicated to the interactive software experience 202 using communication module 114 (block 310) and also to those beads that represent a container for a resource which has an updated quantity (block 312) e.g. using the bead detection module 116. In some examples there may not be a bead on the connecting element which corresponds to a resource which is generated by the detected combination of beads and in which case, the updated quantity of the particular resource (e.g. wheat) may only be communicated to the interactive software experience (in block 310). Alternatively, a bead on the connecting element may be newly designated (by the resource management module 117) as a container for the generated resource and the updated quantity may be communicated to that bead (in block 312).

In various examples, the connecting element 102 (via communication module 114) may also receive updated quantity data from the interactive software experience (block 314) and this updated quantity data may then be communicated to any beads that represent a container for a resource which has an updated quantity (block 312, e.g. using the bead detection module 116).

The fifth scenario is very similar to the fourth scenario, with the only difference being that the resource management module 117 is not part of the connecting element but is instead implemented within a smart bead (which may be referred to as a resource manager bead). The fifth scenario operates as described above for the fourth scenario except that the updating of resource quantities occurs within the resource manager bead. Data about detected beads may be stored within a storage element in the resource manager bead or a storage element 112 in the connecting element. Communication between the resource manager bead and the interactive storage element may still be via a communication module 114 in the connecting element 102, or alternatively the resource manager bead may comprise a communication module.

In a variation of any of the five scenarios described above, the resource management module 117 may be implemented on a separate computing device (e.g. a smartphone, tablet or other portable computing device, or a remote computing device, such as a server in a data center) instead of the fashion item. This separate computing device may also run the interactive software experience or the interactive software experience may run on another computing device.

Although the description of the five scenarios above refers to use of the communication module 114 to communicate with the interactive software experience, in some examples the interactive software experience may be implemented within the fashion item (e.g. in the connecting element or a smart bead). In such examples, data that is transmitted to the interactive software experience or received from the interactive software experience may use other communication means (e.g. via electrical connections between the connecting module and the smart beads) and in some examples, the fashion item may not comprise a communication module 114.

The updating of resource quantities (in block 308) is described above as being dependent upon detected combinations of smart beads. There are many different ways in which the resource management module may determine how to update resources based on the detected beads. In a first example, the updating (in block 308) may perform all actions for which the prerequisites (i.e. the required combination of actor(s) and/or resource(s)) are present (i.e. the corresponding beads are detected). In this first example, if there are actions which compete for the same resources, they may share the resources between the actions (e.g. each use half of the available resources) unless the user specifies otherwise. In a second example, the updating may, at every time step, perform one instance of every action for which the prerequisites are present (e.g. in a default or user-specified order of attempting). This may lead to some degree of sharing of resources where there are competing actions as an earlier action will consume part of the resource ahead of a later performed action (which may, in some examples, prevent the execution of the later action). In a third example, the updating may be based on in-game understanding of the value of resulting resources (e.g. in value if sold in in-game currency, or value as pre-specified by the user) and the actions which are performed may be selected to maximize the "value add" of use of resources.

In various examples, the updating of resource quantities (in block 308) may also be dependent upon other factors, such as the length of time that the particular combination of beads remains detected (e.g. resource A is only created if beads B and C are in proximity to each other for more than D minutes), and/or a real world activity of the user (e.g. resource A is only created if beads B and C are in proximity to each other in real world location E or resource A is only created if beads B and C are in proximity to each other and the user performs F minutes of physical activity or resource A is only created if beads B and C are in proximity to each other and worn by two or more different users in a defined time period). In examples where real world activity is a factor in the updating of resource quantities, the fashion item (e.g. the connecting element or one or more smart beads) may comprise sensors (e.g. GPS module, accelerometer, etc.). In various examples, the updating may also be dependent upon user interaction with the interactive software experience or an input device on the fashion item (e.g. a button or sensor on a bead). For example, an interactive software experience may specify a rate at which actions can be performed and they may only be performed in response to a user input which triggers the action. In this way, a user is incentivized to maintain their attention to the interactive software experience and to actuate beads in the right order to trigger particular actions (e.g. to complete challenges against other users). In various examples, the updating may be dependent upon the particular arrangement or order of detected beads (e.g. bead A must be next to bead B in order for a particular action to be performed).

In various examples, the updating of resource quantities may only be performed autonomously by the resource management module based on detected beads which are being worn. This has the effect that if a fashion item is removed by the user, the resource management module in the fashion item (e.g. in the connecting element or a resource manager bead on the connecting element) does not perform any autonomous updating of resource quantities. Furthermore, if a fashion item which is being worn by a user is brought into proximity with a second fashion item that is not being worn, then even if beads on that second fashion item are detected by the first fashion item (that is being worn), those beads will not be used in the updating of resources (in block 308). In various examples, there may be further restrictions, such as the updating of resource quantities only being performed based on detected beads which are worn by the same user or by specified users (e.g. by a group of friends). This may, for example, enable team-based gameplay.

In the scenarios described above, the quantity data for a virtual resource is updated by the resource management module based combinations of detected (in block 308). In various examples, the properties (e.g. skills) of an actor may also be updated based on combinations of detected beads. For example, actors may learn new skills (i.e. actions) based on being (i) around other actors who know the skills, (ii) around the right resources for the skills, where there is a random probability that the skill is discovered, (iii) through in-app purchase, (iv) over time, (v) with experience, (vi) randomly. For example, a woodcutter bead may be able to chop down one tree each hour (most recent action<1 hour→no action) but over time may "level up" to be quicker (i.e. the actor's skill level is affected by the history of interactions).

As described above, where a bead represents a container for a resource (e.g. in scenarios 1, 4 and 5), the amount of the virtual resource (i.e. the resource in the virtual world in the interactive software experience) will vary over time as actors consume or generate the particular resource. In various examples, the resource may also be considered perishable and so the amount of the virtual resource in a container may reduce over time independent of the actions of any actors. When the quantity of a resource in a container falls to zero, a user may have a number of different options for replenishing that virtual resource and different interactive software experiences may provide one or more of these options. The options include, but are not limited to:

Generating the resource using an actor
Purchasing an additional amount of the resource (e.g. through the interactive software experience), where this may be purchased from another user or from a retailer (who may be the operator of the interactive software environment)
Trading resources with another bead, which may belong to the same or a different user
Purchasing a replacement bead which represents a container of the resource
Earning additional resources through interaction with the interactive software experience
Completing a real or virtual world activity as directed by the interactive software experience (e.g. by the user going to a specified location whilst wearing the fashion item, posting X photos on social networking site)
"recharging" the resource by bringing it into close proximity with a local hot spot/beacon that the interactive software experience has designated as a virtual source of the virtual resource
Interacting with other linked software experiences, e.g. a games console game or online game As described above, a user may wish to trade resources. To achieve this they may configure the resource they wish to give to another user and the resource they wish to receive in return. The trade may then be implemented autonomously, based on the criteria specified by the user, by the resource management module if the user's fashion item is brought into proximity with a second user's fashion item where the second user has defined compatible trade criteria. For example, if user A specifies that they wish to swap no more than amount X of resource A for amount Y of resource B and user B specifies that they wish to swap no more than amount Z of resource B for amount X of resource A, the swap can be performed autonomously when the fashion items of users A and B are in proximity and as long as amount Z is greater than, or equal to, amount Y.

In various examples, a user may be able to update the parameters of an actor through real world activity in addition to (or instead of) the real world activity affecting resources within the interactive software experience. For example, a user may be able to increase the efficiency/skill of an actor (e.g. an actor bead) through real world activity, such that the actor generates a particular resource at a faster rate or by consuming a smaller amount of another resource. In an example, a user may be able to "upskill" an actor by taking the actor bead (or the fashion item) to a particular location, by performing physical exercise, by bringing it into contact with one or more other actor beads (e.g. of a specified type e.g. a 'trainer' bead), etc.

In the examples described above, the fashion item communicates updated quantities of virtual resources to the interactive software experience (in block 310). In various examples, the fashion item may also communicate other data to the interactive software experience, such as any or all of the other data which may be received by the bead detection module 116 from the detected smart beads (and stored in storage element 112). This other data may be used to modify the operation of the interactive software experience.

Figure 4:
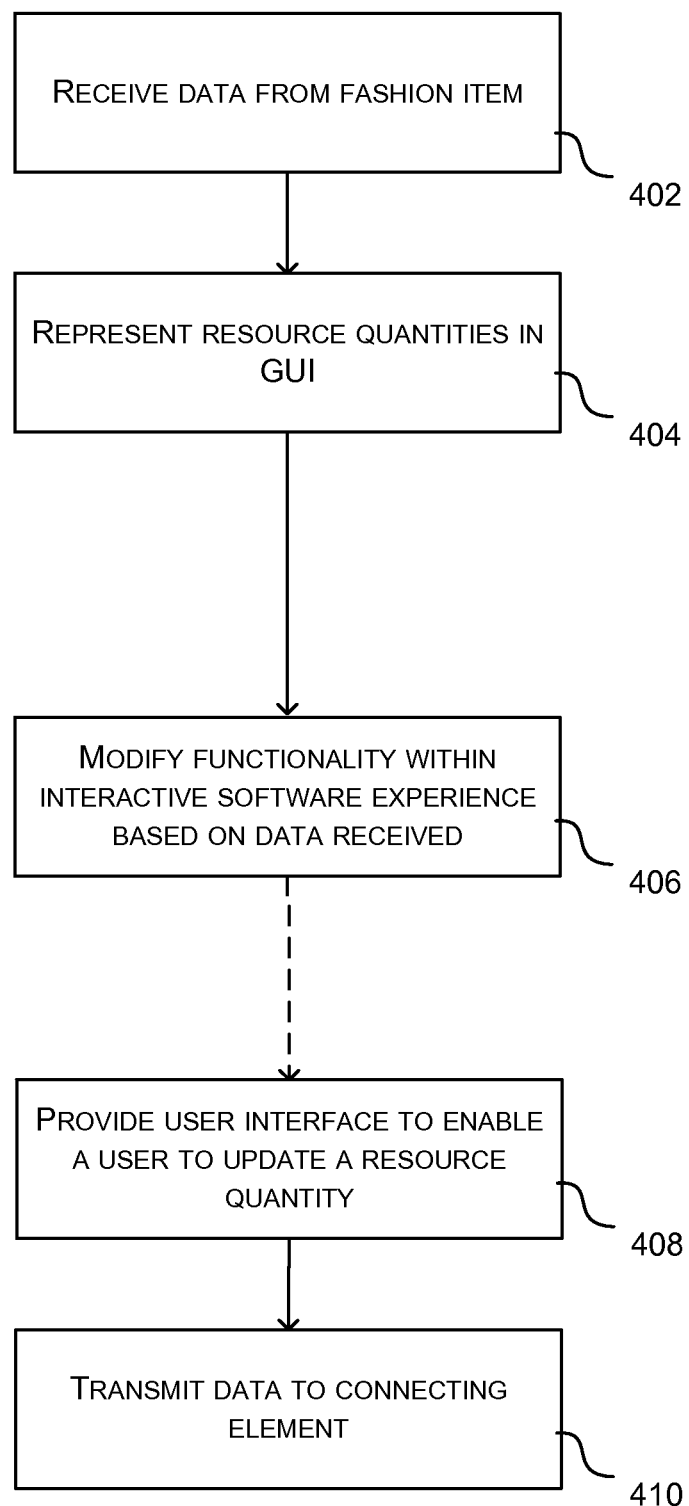
FIG. 4 is a schematic diagram showing an example method of operation of an interactive software experience. Like reference numerals are used to designate like parts in the accompanying drawings.

FIG. 4 is a schematic diagram showing an example method of operation of an interactive software experience 202. As described above, the interactive software experience 202 receives data from the fashion item 102 (block 402). This data comprises updated quantities of virtual resources within a virtual world provided by the interactive software experience and the resource quantities (and the changes to those quantities) may be represented within the GUI of the interactive software experience (block 404) and/or otherwise affect the functionality of the interactive software experience (block 406). As described above, other data may also be received from the fashion item (e.g. a 2D/3D representation of a smart bead) and this data (where received) along with the updated quantities of resources may be used to modify the functionality of the interactive software experience (block 406). For example, the GUI and/or other functionality within the interactive software experience (e.g. new styles, characters, resources, etc.) may be unlocked based on the data received from the fashion item.

As described above, in some examples the interactive software experience may provide a user with the ability to purchase, update or otherwise obtain additional resources through the GUI (block 408) and where this is implemented in the interactive software experience, any resultant change in resource quantities is transmitted to the fashion item which comprises a container for that resource (block 410) e.g. to a fashion item with a bead that represents a container for the resource.

The interactive software experience described herein may, for example, be a computer game. In various examples the game may be a single or multiplayer game. In other examples, the game may be a massively multiplayer online game (e.g. with hundreds or thousands of users sharing the same virtual world). By using the methods and apparatus described herein, the fashion item (and the resource management module in it) provides offline gameplay (e.g. massively multiplayer offline gameplay) which can then be synchronized subsequently with the online version (e.g. resource management modules may store updated quantities of resources and further update these before subsequently providing the values to the interactive software experience). In various examples, a game may be set up in a way that requires trading physical beads between users in order for users to make progress.

As described above, a smart bead or the connecting element may comprise a display or other visual indicator to show the amount of a virtual resource which is currently within a virtual container that it represents (e.g. two LEDS lit=full, one LED lit (and the other not)=half full, neither LED lit=empty). Additional granularity and/or information about a bead may be provided via a second computing device (e.g. a smart phone or tablet) which may act as a "bead reader". In such an example, the second computing device communicates with the fashion item to obtain information about the bead (e.g. virtual resource quantities) and this may then be displayed within a GUI on the second computing device. In various examples, a bead reader computing device may provide information about beads on a connecting element (e.g. quantities of virtual resources) where the beads do not comprise any visual indicator.

The types of virtual resources and actors may depend on the type of interactive software experience with which they communicate. Examples of actors include virtual characters with particular skills (e.g. miners, smelters, herb pickers, etc.), recipes, etc. In various examples, the actors may be configurable by a user (e.g. via the interactive software experience).

An implementation of the system described above on distributed fashion items (e.g. beads and connecting elements) enables (massively) multiplayer games to be played on wearable devices without requiring online interne connectivity. In various examples, the storing of data on beads permits offline trading of virtual resources/skills.

In an example, a device comprises a connecting element arranged to receive one or more smart beads, wherein a smart bead represents a virtual resource in an interactive software experience or an action on a virtual resource in the interactive software experience. The device comprises: a bead detection module arranged to detect and identify one or more smart beads attached to the connecting element; and a resource management module arranged to autonomously update quantities of one or more virtual resources based on combinations of virtual resources and/or actions on virtual resources, wherein at least one of the virtual resources or actions in any combination is represented by a detected smart bead.

In an example, a device comprises a connecting element arranged to receive one or more smart beads, wherein a smart bead represents a virtual resource in an interactive software experience or an action on a virtual resource in the interactive software experience. The device comprises: means for detecting and identifying smart beads attached to the connecting element; and means for autonomously updating quantities of one or more virtual resources based on combinations of virtual resources and/or actions on virtual resources, where at least one of the virtual resources or actions in any combination is represented by a detected smart bead.

The resource management module may be arranged to autonomously update quantities of one or more virtual resources based on combinations of two or more detected smart beads.

The device may further comprise a storage element arranged to store data detailing the updates to the quantities of the one or more virtual resources.

The device may be a fashion item and/or a wearable device.

The device may further comprise one or more sensors arranged to detect whether the wearable device is being worn by a user and the resource management module may be arranged to autonomously update quantities of one or more virtual resources based on combinations of two or more smart beads which are detected and being worn by a user.

The bead detection module may be further arranged to detect smart beads attached to a proximate connecting element.

The resource management module may be further arranged to autonomously increase a quantity of a virtual resource represented by a first detected bead and decrease a quantity of a second virtual resource represented by a second detected bead based on user defined trading parameters and wherein the first and second detected beads are attached to different connecting elements.

The resource management module may be arranged to autonomously update quantities of one or more virtual resources based on combinations of two or more detected smart beads and a detected real world activity of a user.

The resource management module may be arranged to autonomously update quantities of one or more virtual resources based on combinations of two or more detected smart beads and a detected arrangement of the two or more detected smart beads on the connecting element.

The device may further comprise a communication module arranged to communicate the updated quantities of one or more virtual resources to the interactive software experience.

The resource management module is further arranged to autonomously reduce a quantity of a virtual resource at a predefined rate (e.g. to gradually reduce the quantity of a virtual resource in addition to any other updates to the quantity of the resource that are performed based on combinations of detected beads).

In an embodiment the smart bead represents a virtual resource and the connecting element represents an action on a virtual resource.

In an embodiment the smart bead represents an action on a virtual resource and the connecting element represents one or more virtual resources.

In an embodiment the smart bead represents an action on a virtual resource contained within the interactive software experience.

In various examples, at least one of the detected smart beads represents a virtual resource and at least another of the detected smart beads represents an action on the virtual resource.

In an example, a system comprises one or more smart beads. A smart bead is connectable to a connecting element to form a fashion item and comprises a storage element. The storage element is arranged to store a parameter representing a quantity of a virtual resource in an interactive software experience or data describing an action on a virtual resource in the interactive software experience.

In other examples, the smart bead is connectable to a connecting element to form a wearable item.

The system may comprise at least one smart bead comprising a storage element arranged to store a parameter representing a quantity of a virtual resource and at least one smart bead comprising a storage element arranged to store data describing an action on a virtual resource in the interactive software experience The system may further comprise a smart bead arranged to autonomously update quantities of one or more virtual resources based on combinations of two or more smart beads attached to a connecting element or to a plurality of proximate connecting elements. Alternatively, the system may comprise a connecting element arranged to autonomously update quantities of one or more virtual resources based on combinations of two or more smart beads attached to the connecting element and/or to a proximate connecting element.

A smart bead may further comprise one or more sensors.

A smart bead may further comprise a visual indicator arranged to display an indication of the parameter representing the quantity of the virtual resource.

In an example a method comprises: receiving, in an interactive software experience, data from a fashion item (or a wearable device), the data identifying an update to a quantity of a virtual resource in a virtual world within the interactive software experience; and modifying the graphical user interface or other functionality within the interactive software experience based on the data received.

In an example a method comprises: detecting and identifying one or more smart beads attached to a connecting element; and autonomously updating quantities of one or more virtual resources in an interactive software experience based on combinations of virtual resources and/or actions, wherein at least one of the virtual resources or actions in any combination is represented by a detected smart bead.

The interactive software experience is a multiplayer online game.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising a connecting element arranged to receive one or more smart beads, wherein a smart bead represents a virtual resource in an interactive software experience or an action on a virtual resource in the interactive software experience, the device comprising:
   a bead detection module arranged to detect and identify a combination of two or more smart beads attached to the connecting element, wherein a first smart bead in the combination of smart beads represents a first virtual resource or action and a second smart bead in the combination of smart beads represents a second virtual resource or action; and
   a resource management module arranged to autonomously update quantities of one or more additional virtual resources that are:
      different from both the first virtual resource or action and the second virtual resource or action, and
      not represented by the first smart bead, the second smart bead, or the detected combination,
   wherein the autonomous updating is performed based at least in part on:
      the detected smart bead combination, and
      one or more equations or expressions defining an effect on the additional virtual resources of combining the first virtual resource or action with the second virtual resource or action represented by the detected smart bead combination.

2. The device according to claim 1, wherein the device is a wearable device.

3. The device according to claim 2, further comprising one or more sensors arranged to detect whether the wearable device is being worn by a user and wherein the resource management module is arranged to autonomously update quantities of one or more virtual resources based on combinations of two or more smart beads which are detected and being worn by a user.

4. The device according to claim 1, wherein the bead detection module is further arranged to detect smart beads attached to a proximate connecting element.

5. The device according to claim 4, wherein the resource management module is further arranged to autonomously increase a quantity of a virtual resource represented by a first detected bead and decrease a quantity of a second virtual resource represented by a second detected bead based on user defined trading parameters and wherein the first and second detected beads are attached to different connecting elements.

6. The device according to claim 1, wherein the resource management module is arranged to autonomously update quantities of one or more virtual resources based on combinations of two or more detected smart beads and a detected real world activity of a user.

7. The device according to claim 1, wherein the resource management module is arranged to autonomously update quantities of one or more virtual resources based on combinations of two or more detected smart beads and a detected arrangement of the two or more detected smart beads on the connecting element.

8. The device according to claim 1, further comprising a communication module arranged to communicate the updated quantities of one or more virtual resources to the interactive software experience.

9. The device according to claim 1, wherein the resource management module is further arranged to autonomously reduce a quantity of a virtual resource at a predefined rate.

10. The device according to claim 1, wherein the smart bead represents a virtual resource and the connecting element represents an action on a virtual resource.

11. The device according to claim 1, wherein the smart bead represents an action on a virtual resource and the connecting element represents one or more virtual resources.

12. The device according to claim 1, wherein the smart bead represents an action on a virtual resource contained within the interactive software experience.

13. The device according to claim 1, wherein at least one of the detected smart beads represents a virtual resource and at least another of the detected smart beads represents an action on the virtual resource.

14. A system comprising:
   one or more smart beads, a smart bead being connectable to a connecting element to form a fashion item and comprising a storage element, wherein the storage element is arranged to store a parameter representing a quantity of a virtual resource in an interactive software experience or data describing an action on a virtual resource in the interactive software experiences;
   a bead detection module arranged to detect and identify a combination of two or more smart beads, wherein a first smart bead in the combination of smart beads stores a first parameter and a second smart bead in the combination of smart beads stores a second parameter; and
   a resource management module arranged to autonomously update quantities of one or more additional stored parameters that are:

different from both the first parameter and second parameter, and not represented by the first smart bead, the second smart bead, or the detected combination, wherein the autonomous updating is performed based at least in part on:

the detected smart bead combination, and one or more equations or expressions defining an effect on the one or more additional stored parameters of combining the first parameter in the detected smart bead combination with the second parameter in the detected smart bead combination.

15. The system according to claim 14, comprising at least one smart bead comprising a storage element arranged to store a parameter representing a quantity of a virtual resource and at least one smart bead comprising a storage element arranged to store data describing an action on a virtual resource in the interactive software experience.

16. The system according to claim 14, further comprising a smart bead arranged to autonomously update quantities of one or more virtual resources based on combinations of two or more smart beads attached to a connecting element or to a plurality of proximate connecting elements.

17. The system according to claim 14, wherein a smart bead further comprises one or more sensors.

18. The system according to claim 14, wherein a smart bead further comprises a visual indicator arranged to display an indication of the parameter representing the quantity of the virtual resource.

* * * * *